UNITED STATES PATENT OFFICE.

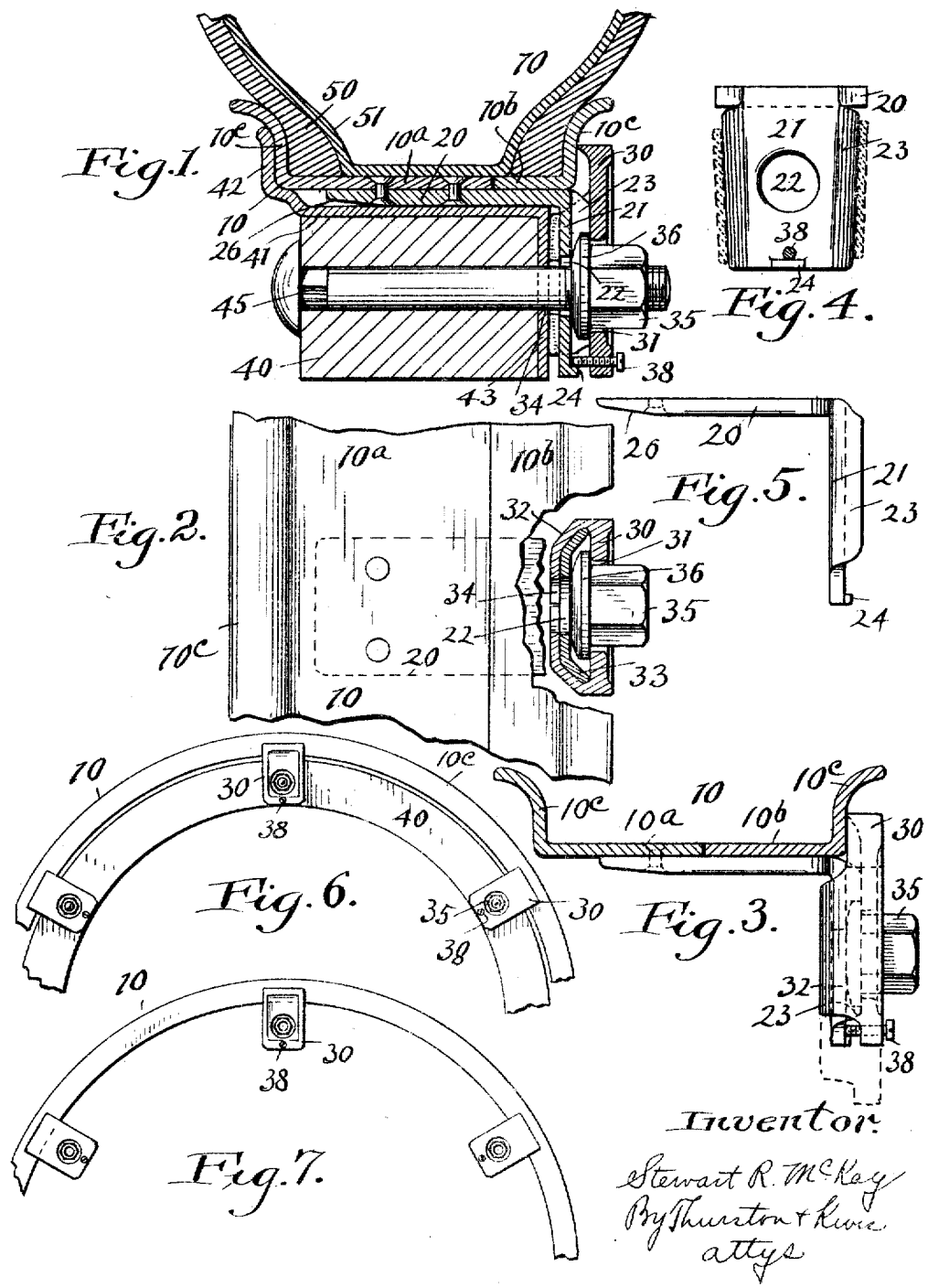
S. R. McKAY.
DEMOUNTABLE RIM FOR VEHICLE WHEELS.
APPLICATION FILED JULY 28, 1916.
1,306,828. Patented June 17, 1919.
2 SHEETS—SHEET 1.

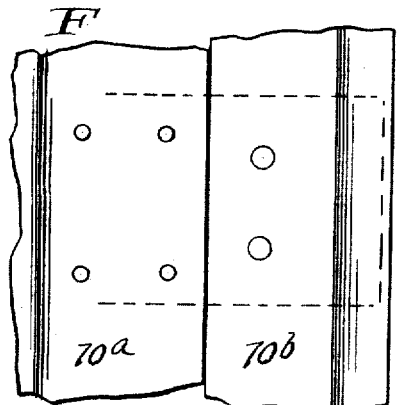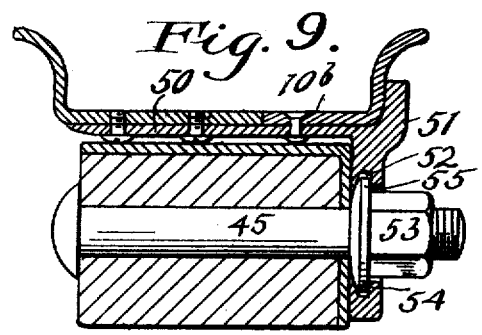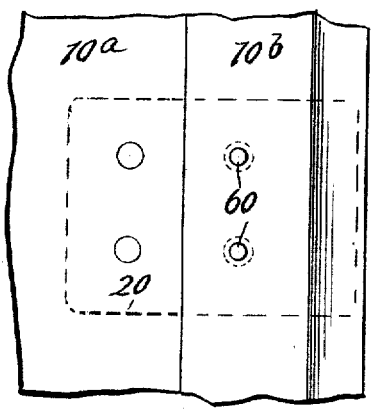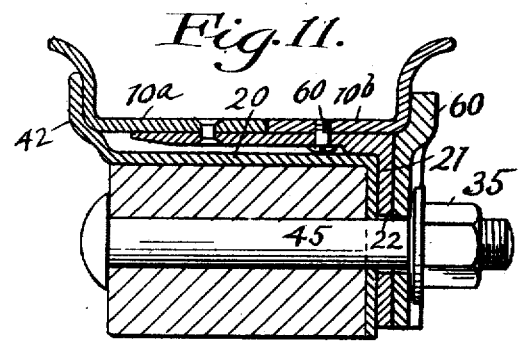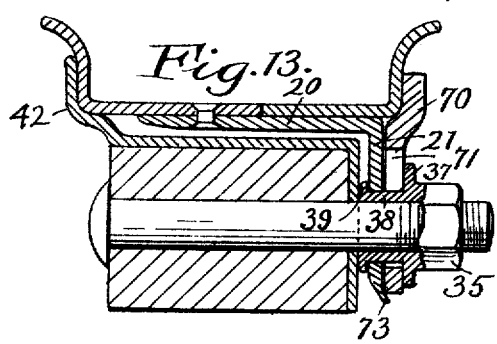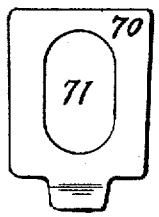

STEWART R. McKAY, OF CLEVELAND, OHIO, ASSIGNOR TO THE McKAY COMPANY, OF CLEVELAND, OHIO, A CORPORATION OF OHIO.

DEMOUNTABLE RIM FOR VEHICLE-WHEELS.

1,306,828.  Specification of Letters Patent.  Patented June 17, 1919.

Application filed July 28, 1916. Serial No 111,785.

*To all whom it may concern:*

Be it known that I, STEWART R. McKAY, a citizen of the United States, residing at Colonial Heights, Cleveland, in the county of Cuyahoga and State of Ohio, have invented a certain new and useful Improvement in Demountable Rims for Vehicle-Wheels, of which the following is a full, clear, and exact description.

This invention relates to demountable tire-carrying rims for automobile wheels.

The objects are to provide a rim capable of carrying an inflated pneumatic tire as well when the rim is off the wheel as when on the wheel; to so construct the rim that the tire may be easily put onto and removed therefrom; and to provide also suitable means by which the rim, with a tire thereon, may be readily placed upon and securely held upon a wheel rim or readily taken therefrom when desired.

The invention consists in the construction and combination of parts shown in the drawing, hereinafter described, and definitely pointed out in the appended claims.

In the drawing, Figure 1 is a radial section which shows the rim and tire thereon and the means for holding the two parts of the rim together, and this figure also shows such rim held upon a wheel provided for that purpose; Fig. 2 is a plan view of the rim shown in Fig. 1 partly broken away and with the rim retaining devices in section; Fig. 3 is a radial section of the rim, and shows one set of means carried by the rim for holding the two parts of the rim together, and for holding the rim on the wheel. Fig. 4 is an outside view of one of the rim clamps; Fig. 5 is a side view of one of the bridge plates; Fig. 6 is an outside view of a part of a wheel rim with the demountable rim secured thereon and the means provided for that purpose; Fig. 7 is a side view of part of the demountable rim when separate from the wheel; Fig. 8 is a plan view of a part of the rim shown in Fig. 9; Fig. 9 is a radial section of a different specific embodiment of the generic invention; Fig. 10 is a plan view of a part of one rim section and of the bridge piece attached thereto; Fig. 11 is a radial section of another specific embodiment of the generic invention; and Fig. 12 is a radial section of another specific embodiment of the invention; Fig. 13 is a radial section of another specific embodiment of the invention; and Fig. 14 is a side view of the clamp shown in Fig. 13.

Referring for the time being to that embodiment of the invention shown on Sheet 1, 40 represents the felly of an ordinary automobile wheel; 41 the metal felly band fitted and secured thereon, and provided along its inner edge with an outwardly extended rim clamping flange 42. This felly band is also provided along its outer edge with a flange 43 which extends inward, i. e., toward the center of the wheel and lies in contact with the outer face of the felly.

The rim 10 is composed of two circumferentially separable cylindrical sections $10^a$, $10^b$, each of which is provided with an outwardly extended tire holding flange $'10^c$. The shape of these flanges may be varied at will to adapt the rim for use with any particular kind of a pneumatic tire. As shown, the rim is what is known as a straight side rim, constructed to hold a straight side pneumatic tire casing 50. The inner tube of such a tire is indicated by 51.

The two rim sections are connected together at intervals by the bridge plates 20 of which there may be any desired number, preferably about 7. These bridge plates and their associated parts are alike, and therefore a description of one will answer for all. Each bridge plate is riveted to the inner peripheral surface of the inner rim section $10^a$, and it extends under and in contact with the inner periphery of the outer rim section $10^b$. This bridge plate is formed at its outer end with an arm 21 which extends radially toward the axis of the rim alongside of the felly. These bridge plates are or may be of such thickness that when the rim embraces the wheel they will have a free sliding fit on the outer periphery of the felly band.

30 represents a rim clamp. This is mounted to slide radially upon the clamping arm 21 and to occupy, as desired, the operative position shown in Fig. 1 in which its outer end or jaw is engaging the front side of the flange $10^c$ of the outer rim section $10^b$, or the inoperative position as indicated by the dotted lines in Fig. 3, wherein its outer end is not in the path of the outer rim section, which therefore may be separated from the inner rim section. This clamp is held against radial movement away from this operative position by a screw 38 which screws through it and engages with a shoulder 24 on the clamping arm 21. The engagement between this clamp and the clamping arm, such that the former may move radially on the latter may be produced by many well known constructions; but since it is desirable to have between the parts a pocket for the reception of the flange 36 on a nut 35, the construction shown has been devised. In this construction the side edges 33 of the clamp are bent outward,—and the clamp is formed with side flanges which extend behind said clamping arm, so as to lie between it and the felly.

Within this pocket is the flange 36 of a nut 35, which nut passes loosely out through a hole 31 in the rim clamp. There is a hole 22 in the clamping arm, and another hole 34 in the back plate of the rim clamp; and these are to enable the passage through of the bolt 45 which extends through the felly 40 and projects a sufficient distance from the outer side thereof. The nut 35 screws onto this bolt.

When the rim is on the wheel, as shown in Fig. 1, the nut has been screwed upon the bolt against the clamping arm 21, and thereby the rim has been pushed inward over against the rim clamping flange 42. The rim clamp 30 is at this time engaging the side of the flange 10ᶜ of the rim section 10ᵇ, and thereby said rim section is being held in the proper relation to the rim section 10ᵃ.

If, now, it is desired to remove this rim from the wheel, the nut is turned in the reverse direction. Its flange engages the rim clamp, which, as before stated, has a sliding, guiding engagement with the clamping arm, and thereby the nut by pressing against the clamp 30, pulls the entire rim off the wheel.

When the rim is off the wheel, as shown in Fig. 3, and it is desired to remove the tire therefrom, said tire will of course be deflated, and the screw 38 screwed outward, and this permits the rim clamp 30 to be moved radially into the inoperative position shown in Fig. 3 by dotted lines. When all of the clamps have been moved to this position the rim section 10ᵇ may be separated from the rim section 10ᵃ, and then the tire may be removed. While the rim is in this condition another tire may be put on to the rim section 10ᵃ, and the rim section 10ᵇ may be then moved into the position shown, and then the rim clamps 30 are one by one moved radially outward to the operative position shown and the set screw 38 again screwed in.

In the construction shown in Figs. 8 and 9 the bridge plate 50 is riveted to and against the inner periphery of the outer rim section 10ᵇ and passes beneath the outer rim section 10ᵃ and in contact therewith, and is secured thereto by screws. The bridge plate has clamping arm 51, through which is a circumferentially grooved hole 52. The nut 53 has a flange 54, which is rotatably fitted in the groove 55 in the hole 52 of said arm. This nut, as it is screwed onto or off of the bolt will move the arm 51 over against the felly, or pull it away from the felly and thereby partially pull the rim from the wheel.

In the construction shown in Figs. 10 and 11, the bridge piece 20 is riveted to the inner rim section 10ᵃ and goes under and in contact with the outer rim section 10ᵇ to which it is secured by screws 60. This bridge piece has a clamping arm 21 in which is a hole 22 for the passage of the bolt 45. Associated with this rim, and in order to secure it upon a wheel, the felly band of the wheel is provided with an inside rim clamping flange 42. Likewise there is provided an ordinary clamp 60 which engages the other side of the outer rim section. The bolt passes through a hole in this clamp and the nut 35 screws onto the bolt against the outer face of the clamp.

In the construction shown in Fig. 12, the bridge piece 20 is riveted to the outer rim section 10ᵇ, by means of a rivet 61, and passes under and in contact with the inner periphery of the inner rim section 10ᵃ. A flat spring 62 is secured to the under side of the bridge plate, by the rivet 61, for example, and this spring carries a latch 63 which passes through the bridge plate and into a hole 10ᵉ in the inner rim section. The bridge plate is also formed with a clamping arm 21, and it also has an outwardly extending jaw 65 which engages with the outer side of the outer rim section. The felly band with the inside clamping flange 42 is preferably used with this form of the invention.

In the construction shown in Fig. 13, the bridge piece 20 is riveted to the inner rim section and passes under and in contact with the inner periphery of the outer rim section. It is formed with an inwardly turned clamping arm 21. Associated with this clamping arm and adapted to move radially thereon, is a clamp 70 which in its operative position, as shown in Fig. 13, engages the outer side of the outer rim section. The sides of this clamp are turned backward so that they lie close to the sides of the clamping arm 21, and therefore guide the clamp in its radial movements to and from the operative position. There is a radial slot 71 in this clamp. The nut 35 is formed with a cylindrical portion 38 behind the flange 37. This cylindrical portion 38 passes through the slot 71 and through a hole in the clamping arm 21, and the inner end of the cylindrical portion of the nut is upset to form a flange 39, which engages with the back face of the clamping arm 21. The nut may turn freely in the clamping arm and clamp as it is being screwed onto the bolt. The flange 37 engaging the clamp will push it rearward and cause it to clamp against the outer face of the outer rim section when said clamp is in operative position. This clamp will likewise push against the arm 21, whereby the rim will be properly positioned and held on the wheel. The clamp is held in this operative position by a spring 73 which may be formed upon the lower end of the clamping arm 21. This spring goes beneath the lower end of the clamp. By pushing this spring back, the clamp may be moved radially toward the axis of the wheel, and far enough to get it out of the path of the outer rim section, which may therefore be removed.

Having thus described my invention, what I claim is:

1. A demountable tire carrying wheel rim comprising two circumferentially separable rim sections, a plurality of bridge plates each connected to the inner periphery of the inner rim section and passing under and in contact with the inner periphery of the outer rim section, and each having an arm which extends toward the axis of the rim and having a hole for the passage of a rim retaining bolt, a clamp slidably supported upon said arm and movable away from the axis of the wheel and into engagement with the inner rim section or away from the axis of the wheel out of the path of said outer rim section, and means to hold said clamp in operative position.

2. A demountable tire carrying wheel rim comprising two circumferentially separable rim sections, a plurality of bridge plates each connected to the inner periphery of the inner rim section and passing under and in contact with the inner periphery of the outer rim section, and each having an arm which extends toward the axis of the rim and having a hole for the passage of a rim retaining bolt, a clamp slidably supported upon said arm and movable away from the axis of the wheel and into engagement with the inner rim section or away from the axis of the wheel out of the path of said outer rim section, means to hold said clamp in operative position, there being between said clamp and clamping arm a pocket and the clamp having a hole through it even with said pocket, and a flanged nut which passes through a hole in said clamp and having in said pocket a flange too large to pass through said hole.

In testimony whereof I hereunto affix my signature.

STEWART R. McKAY.

Copies of this patent may be obtained for five cents each, by addressing the "Commissioner of Patents, Washington, D. C."